United States Patent
Menke et al.

(10) Patent No.: US 7,261,447 B2
(45) Date of Patent: Aug. 28, 2007

(54) LOW PROFILE EMERGENCY VEHICLE LIGHT BAR

(75) Inventors: W. Kenneth Menke, Glendale, MO (US); W. Kenneth Menke, III, Webster Groves, MO (US)

(73) Assignee: PowerArc, Inc., Shrewsbury, MO (US)

( * ) Notice: Subject to any disclaimer, the term of this patent is extended or adjusted under 35 U.S.C. 154(b) by 354 days.

(21) Appl. No.: 10/624,271

(22) Filed: Jul. 21, 2003

(65) Prior Publication Data

US 2005/0018441 A1    Jan. 27, 2005

(51) Int. Cl.
*B60Q 1/26* (2006.01)

(52) U.S. Cl. ................ 362/503; 362/542; 362/543

(58) Field of Classification Search ............... 362/504, 362/503, 493, 250, 418, 370, 285, 486, 540, 362/542, 543
See application file for complete search history.

(56) References Cited

U.S. PATENT DOCUMENTS

| | | | |
|---|---|---|---|
| 1,541,376 A | | 6/1925 | Nock |
| 2,139,420 A | | 12/1938 | Richards |
| 3,351,904 A | | 11/1967 | Noruk |
| 3,424,490 A | * | 1/1969 | Francis ................ 296/95.1 |
| 3,460,728 A | | 8/1969 | Adamson |
| 3,721,374 A | * | 3/1973 | Eby ................ 224/318 |
| 3,781,790 A | | 12/1973 | Dawson |
| 4,488,141 A | * | 12/1984 | Ohlenforst et al. ........ 362/541 |
| 4,928,216 A | * | 5/1990 | Carr ................ 362/543 |
| 5,091,828 A | | 2/1992 | Jincks et al. |
| 5,097,397 A | | 3/1992 | Stanuch et al. |
| 5,130,906 A | * | 7/1992 | Lund ................ 362/485 |
| 5,152,599 A | | 10/1992 | Lewis et al. |
| 5,422,623 A | | 6/1995 | Bader et al. |
| 5,481,441 A | * | 1/1996 | Stevens ................ 362/35 |
| 5,522,634 A | * | 6/1996 | Stanesic et al. ........... 362/485 |
| 5,585,782 A | | 12/1996 | Yosko |
| 5,609,121 A | | 3/1997 | Gross |
| 5,727,865 A | | 3/1998 | Caldwell |
| 5,884,997 A | | 3/1999 | Stanuch et al. |
| 5,921,199 A | | 7/1999 | Gross |
| 5,974,711 A | | 11/1999 | Tipke |
| 5,988,839 A | * | 11/1999 | Pokorney et al. .......... 362/493 |
| 6,081,191 A | | 6/2000 | Green et al. |
| 6,123,441 A | | 9/2000 | Kasboske |
| 6,126,303 A | | 10/2000 | Gross |
| 6,140,918 A | | 10/2000 | Green et al. |
| 6,203,181 B1 | | 3/2001 | Gross |
| 6,461,008 B1 | | 10/2002 | Pederson |
| 6,511,216 B2 | * | 1/2003 | Strickland ................ 362/542 |
| 6,966,682 B2 | * | 11/2005 | Frank et al. ................ 362/544 |
| 7,036,965 B2 | * | 5/2006 | Dalton et al. ................ 362/488 |
| 2002/0021572 A1 | | 2/2002 | Spring, Jr. |
| 2003/0021121 A1 | | 1/2003 | Pederson |

FOREIGN PATENT DOCUMENTS

| | | |
|---|---|---|
| GB | 002197062 A | 5/1988 |
| JP | 406092179 A | 4/1994 |

\* cited by examiner

*Primary Examiner*—Stephen F. Husar
*Assistant Examiner*—Peggy A. Neils
(74) *Attorney, Agent, or Firm*—Thompson Coburn LLP

(57) ABSTRACT

An emergency vehicle light bar is provided with a flexible support that can be curved to match the curvature of the top edge of a vehicle window when installing the light bar on the vehicle, giving the light bar a low profile relative to the vehicle and giving the vehicle a stealth or "unmarked" appearance.

20 Claims, 5 Drawing Sheets

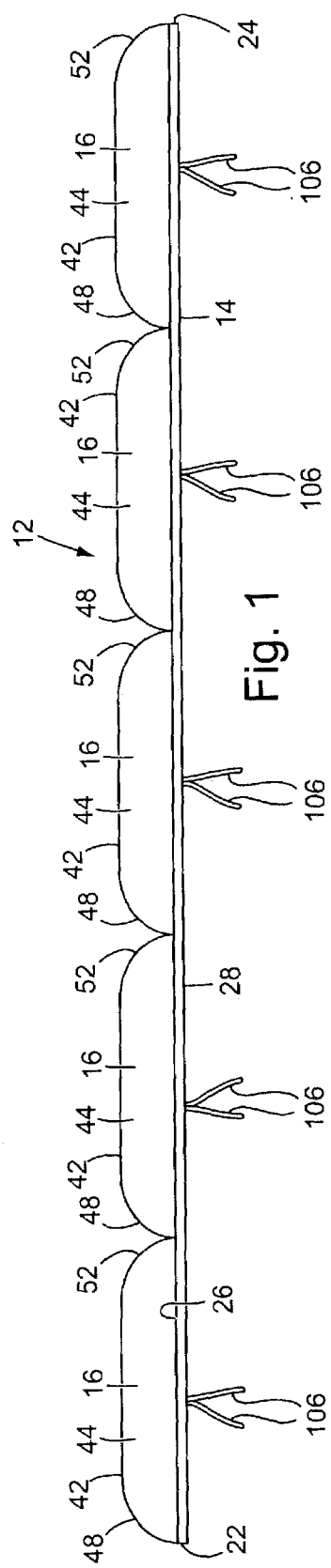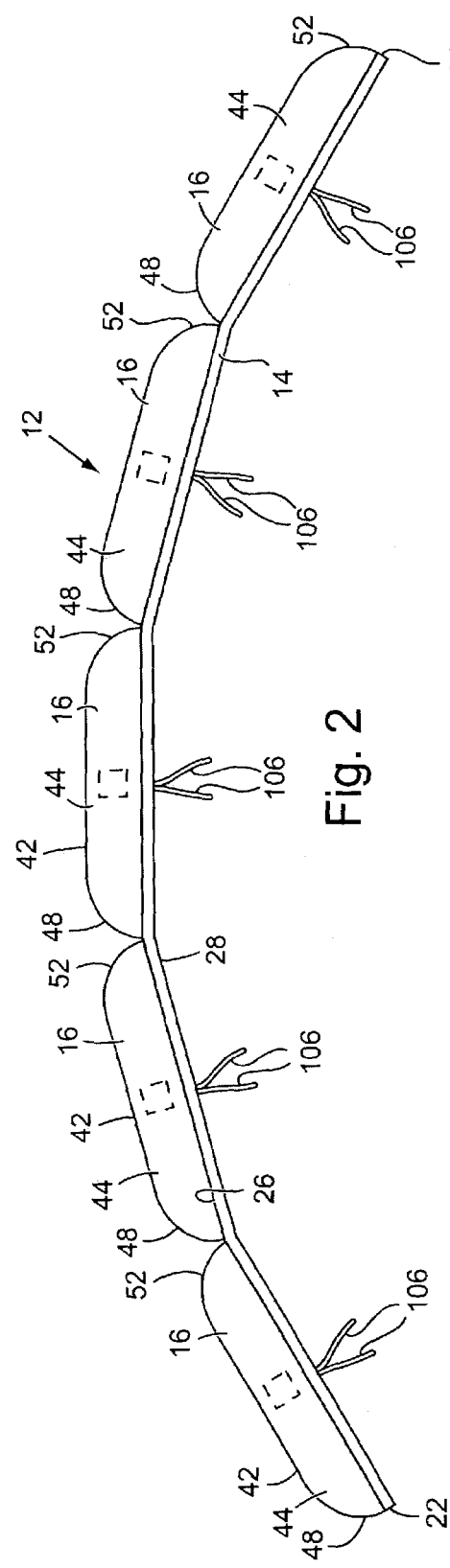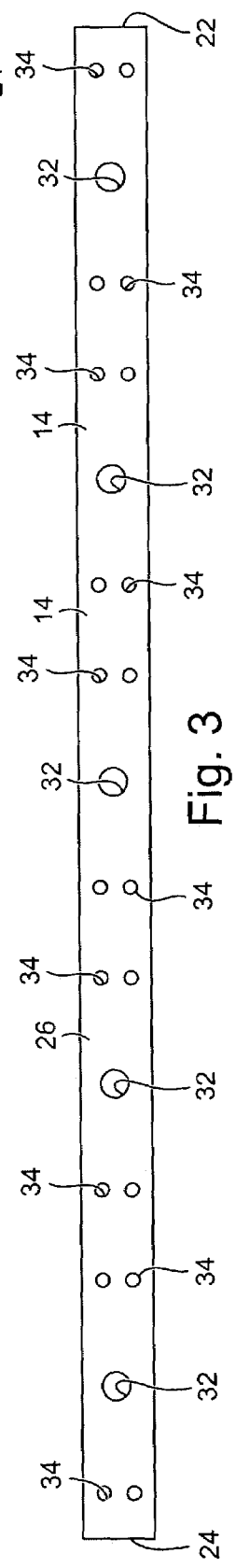

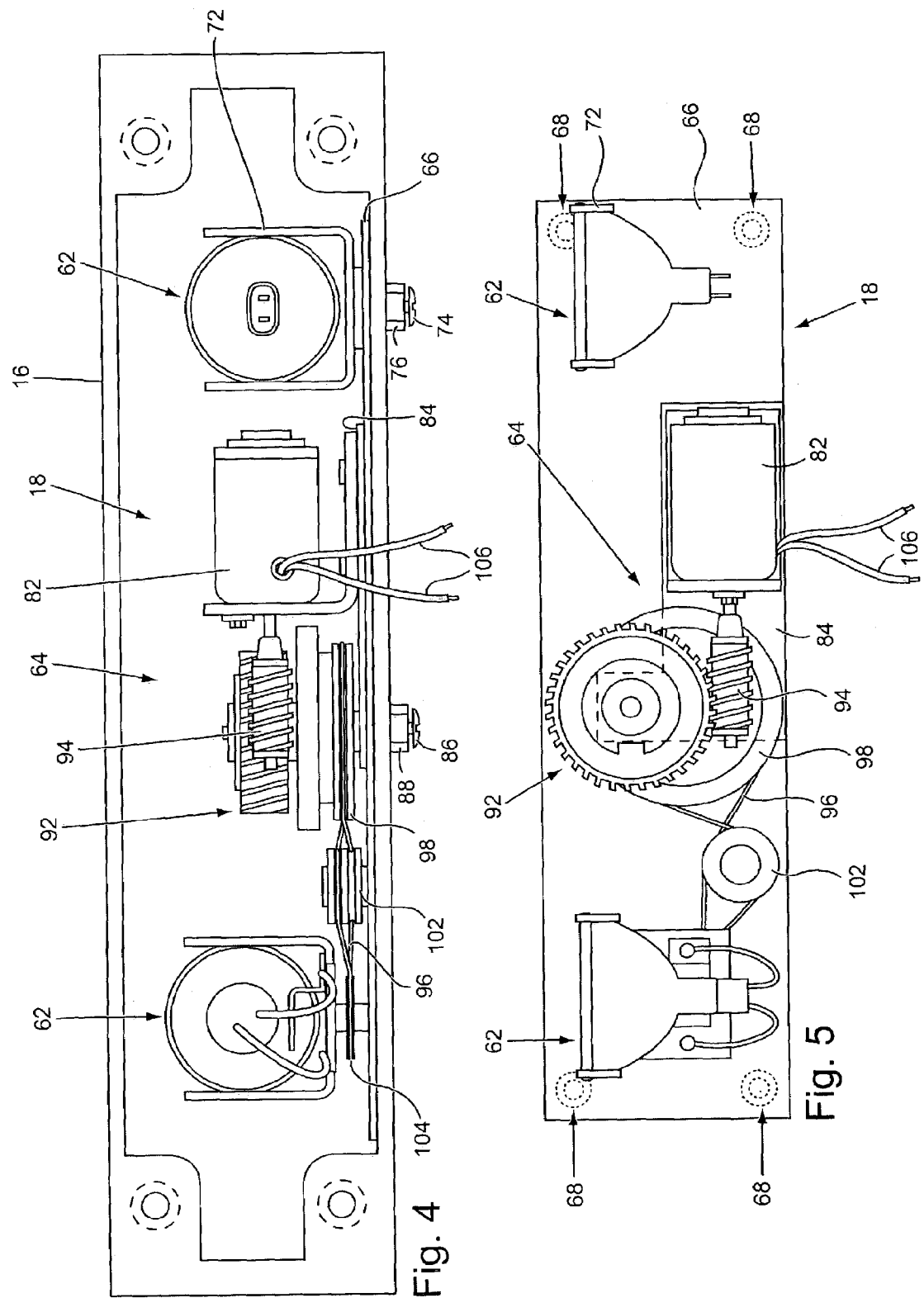

LOW PROFILE EMERGENCY VEHICLE LIGHT BAR

BACKGROUND OF THE INVENTION

1. Field of the Invention

The present invention pertains to a light bar for use on the exterior of emergency vehicles where the light bar is designed to have a low-profile when mounted to the vehicle. In particular, the present invention pertains to a light bar having a flexible support that can be curved to match the curvature of the top edge of the vehicle windshield when installing the light bar on the vehicle, giving the light bar a low profile relative to the vehicle and giving the vehicle a stealth or "unmarked" appearance.

2. Description of the Related Art

Light bars are typically used on emergency vehicles by being mounted to the roof or top of the vehicle with the light bar extending across substantially the entire width of the vehicle. This positioning of the light bar enhances the ability of the flashing warning lights of the light bar to be seen from in front of the vehicle and from behind the vehicle. In addition, many light bars are constructed with flashing warning lights at their opposite ends that enable the light bar to be easily seen from the sides of the vehicle. However, in many police functions, in particular traffic control, it is desirable that the police vehicle have a stealth or "unmarked" appearance of an ordinary vehicle when the warning lights are not in use, and that the vehicle become instantly recognizable as an emergency vehicle when the warning lights are energized.

For many years, the stealth or "unmarked" appearance of emergency vehicles, and in particular police vehicles, was accomplished by using a small, rotating beacon that was operated by power received from the cigar lighter outlet of the vehicle. These emergency lights typically comprised a transparent or translucent colored dome that was mounted on a magnetic base of the light. The dome covered over a rotating or flashing light assembly within the dome. This emergency light was kept inside the vehicle within access of the driver or another officer in the vehicle until needed. When needed, the emergency light was plugged into the vehicle cigar lighter outlet and the magnetic base of the light was positioned on the vehicle dashboard or on the roof or top surface of the vehicle.

Emergency lights of this type enabled the police vehicle to have a stealth or "unmarked" appearance because the emergency light was kept inside the vehicle until needed. However, as the designs of vehicles have changed over the years, use of this type of emergency light has waned because vehicles are now often constructed with dashboards and roofs of nonmetallic materials. In addition, the optical energy of this type of emergency light provides only a tiny fraction of that required by current national standards such as SAE J2498, Minimum Performance of the Warning Light System Used on Emergency Vehicles, and the requirements for small vehicles contained in NFPA 1901, Standard for Automotive Fire Apparatus.

At the present time one of the most popular approaches to installing emergency warning lights on a vehicle while maintaining a stealth or "unmarked" appearance of the vehicle is to install multiple small warning light assemblies on the inside of the vehicle. These emergency light assemblies are typically mounted on the dashboard inside the windshield of the vehicle and on the rear window deck inside the rear window of the vehicle. However, this type of emergency warning light is disadvantaged in that virtually all of the light energy is directed toward the front and rear of the vehicle. Little or none of the flashing signal provided by the light assemblies is directed to the sides or corners of the vehicle to provide protection when the emergency vehicle is entering intersections. In addition, because the highest performance lights are inside the vehicle and the signal light must pass through the angled windshield and rear window, a substantial amount of the light is lost to refraction and reflection. Even more of the light is lost if the windshield or rear window are tinted. Furthermore, unless the emergency light is sealed to the glass of the windshield and rear window, the light may be reflected back into the vehicle and into the eyes of the vehicle's driver.

Another popular approach to installing warning lights on emergency vehicles while maintaining the stealth or "unmarked" appearance of the vehicle is to install small strobe lights into the vehicles turn signal assemblies, stop taillight assemblies, and backup light assemblies. However, these new systems often do not comply with the requirements of the current national standards for emergency vehicle signal lights, and the systems are extremely expensive to install. Furthermore, when the emergency vehicle is decommissioned, these systems are also extremely expensive to remove from the vehicle before the decommissioned vehicle is sold.

To overcome the problems associated with providing a vehicle with emergency warning lights while also maintaining the stealth or "unmarked" appearance of the vehicle, what is needed is an emergency warning light system where all of the systems warning lights are mounted on the exterior of the vehicle, yet the warning lights would be virtually invisible when viewed at a distance from the vehicle. The system would also be inexpensive as well as easily installed on the vehicle, inexpensively and easily serviced, and inexpensively and easily removed from the vehicle without any significant damage to the vehicle.

SUMMARY OF THE INVENTION

The low profile emergency warning light bar of the present invention overcomes the disadvantages associated with prior art light bars described above by providing an emergency warning light system that can be mounted on the exterior of the vehicle where the vehicle still maintains a stealth or "unmarked" appearance at a short distance from the vehicle. The low profile emergency light bar is basically comprised of a flexible strip support, a plurality of case enclosures removably attached to the support, and a plurality of light assemblies contained inside the case enclosures. In the preferred embodiment the light bar is approximately two and one half inches in height, three inches in depth and about forty-five inches in length.

The support is a flexible, thin metallic strip. The support has opposite, flat, front and rear surfaces and a length dimension that will extend the support across the front of a vehicle windshield where the windshield meets the roof or top surface of the vehicle. The support is sufficiently rigid to support the plurality of case enclosures and the plurality of light assemblies, but is also flexible along the length of the support.

Each of the case enclosures has a front wall, opposite top and bottom walls and opposite side walls. The rear of each case enclosure is left open. The front wall, bottom wall and side walls of each case enclosure are preferably molded of a clear or color-tinted plastic material. The top wall of the case enclosure is constructed of a metal and is secured to the remainder of the case enclosure by an adhesive, by fasteners or by other equivalent means. Several fastener holes pass through the case enclosure and align with fastener holes in the support. Screws, nut and bolt fasteners or other equivalent means secure each case to the front surface of the support with the rear opening of the case being closed over by the support front surface.

Each light assembly includes one or more optical elements that are comprised of the recently developed high performance LED's or miniature prefocused halogen lamps with optics or reflectors that are less than two inches in diameter. Each optical element and a motive source are supported on a plate that in turn is mounted to the case bottom wall in the interior of the case. In the preferred embodiment the support plate is mounted in the interior of the case to enable the adjustable orientation of the optical element from outside of the case with the light bar installed on a vehicle to achieve the desired area of projected light.

In the preferred embodiment five case enclosures with their associated light assemblies are mounted to the front surface of the support along the length of the support. The flexibility of the support enables it to be curved to match the curvature of the top of a vehicle windshield to which the light bar is to be attached. A plurality of brackets are secured to the bottom walls of the cases on the support. The brackets can be attached to the light bar cases by adhesives, by mechanical fasteners or other means. The brackets are designed to be attached to the exterior surface of the vehicle windshield by an adhesive or by double-faced adhesive tape. This enables the installer of the light bar to bend the light bar along its length to match the curvature at the top of the vehicle windshield, and then secure each of the plurality of brackets to the exterior surface of the windshield to hold the light bar in its curved configuration. In the preferred installation the light bar is attached to the vehicle windshield adjacent the top edge of the windshield where it joins with the rearwardly extending roof or top surface of the vehicle. More preferably, the top of the light bar does not extend above the top of the vehicle. On most vehicles this positions the light bar in the tinted area of the glass at the top of the vehicle windshield which enhances the ability of the light bar to blend into the profile of the vehicle making it difficult to observe the light bar from a short distance from the vehicle.

By installing the light bar on the exterior of the windshield, the installation is cost efficient. Furthermore, the case enclosures are easily removed from the support without removing the support from the windshield, making maintenance of the light assemblies cost efficient. Still further, the light bar can be removed from the windshield by breaking the adhesive or double-sided tape connection of the brackets to the windshield exterior surface, making removal of the light bar from the vehicle cost efficient when the vehicle is decommissioned.

BRIEF DESCRIPTION OF THE DRAWING FIGURES

Further features of the invention are set forth in the following detailed description of the preferred embodiment of the invention and in the drawing figures wherein:

FIG. 1 is a plan view of the light bar of the present invention in a straight configuration of the light bar;

FIG. 2 is a plan view of the light bar of FIG. 1 shown in a curved configuration;

FIG. 3 is a view of the front surface of the support of the light bar;

FIG. 4 is a rear view of one case enclosure for a light assembly of the light bar;

FIG. 5 is a plan view of a light assembly removed from its case enclosure;

DESCRIPTION OF THE PREFERRED EMBODIMENT

Figure 6:
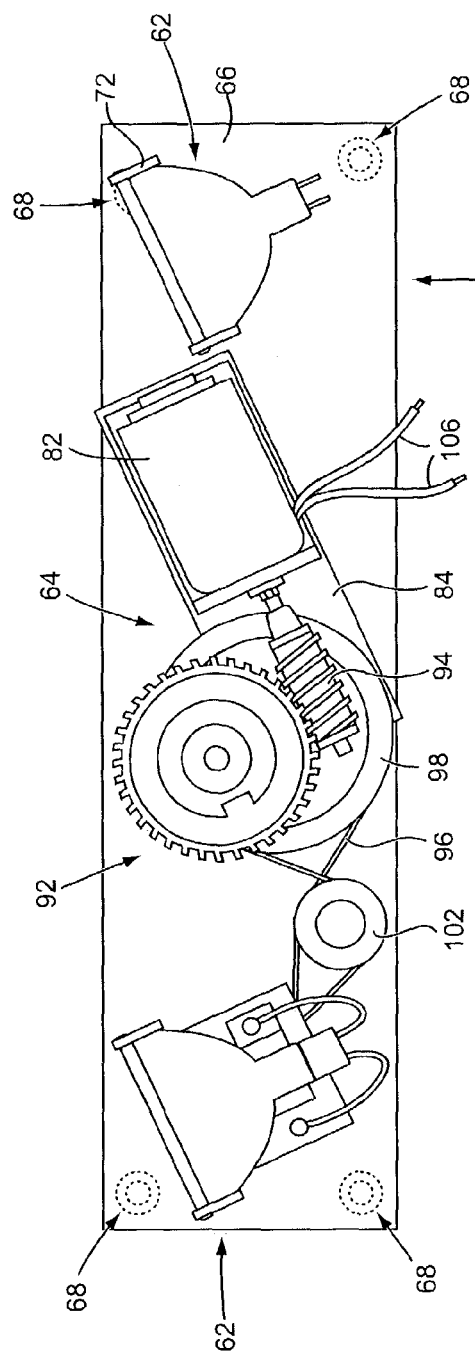
FIG. 6 is a plan view of the light assembly of FIG. 5, but with the positions of the optical elements adjusted.
Figure 7:
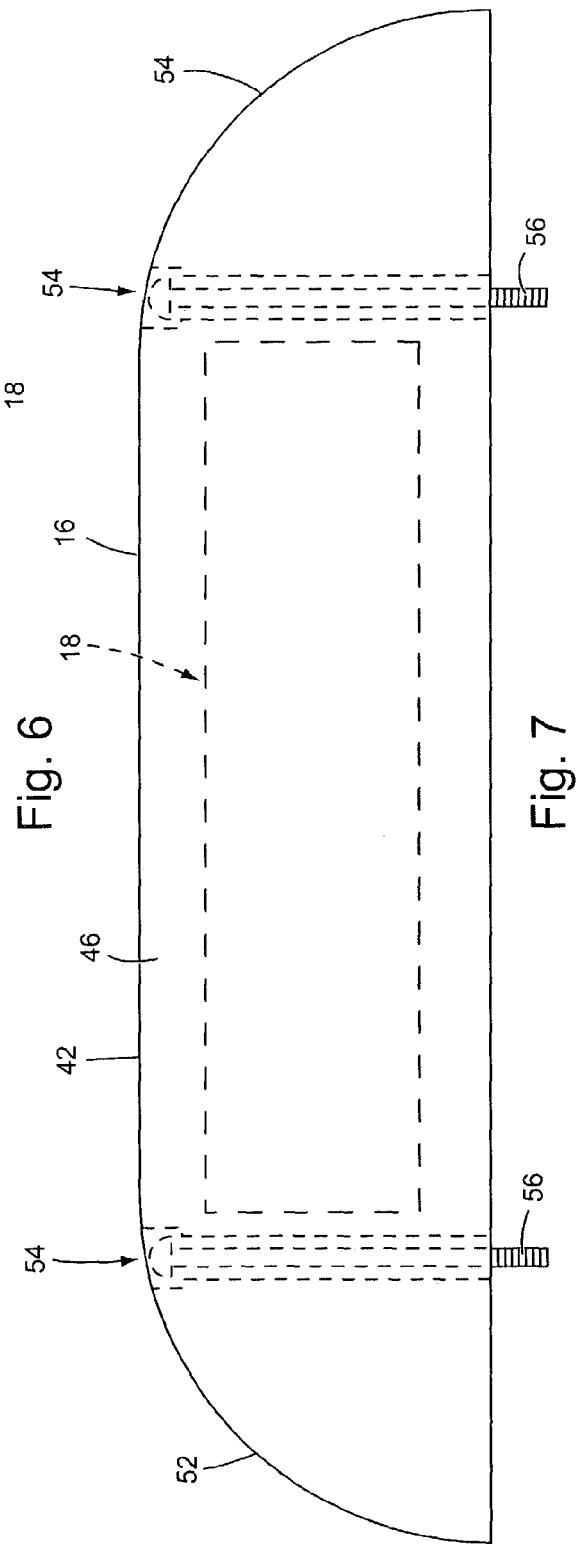
FIG. 7 is a bottom view of a case enclosure.

Top views of the low profile emergency light bar 12 of the present invention are shown in FIGS. 1 and 2. The emergency light bar 12 is basically comprised of a formable, flexible strip support 14, a plurality of case enclosures 16 that are removably attached to the support 14, and a plurality of light assemblies 18 that are contained inside the case enclosures 16. In the preferred embodiment the light bar is approximately two and one half inches in height, three inches in depth and about forty-five inches in length. The length of the light bar will change for different vehicles having different widths. Additionally, the height and depth dimensions of the light bar can change to suit it for use with a particular vehicle. Although the light bar 12 will be described being used with a police emergency vehicle, it should be understood that the light bar 12 of the invention may be used in any application where conventional light bars are used. In addition, although the light bar is described as being used on the front windshield of the vehicle, it could also be mounted on different areas of the vehicle and in particular, on the rear window.

In the illustrative embodiment of the light bar 12, the light bar is comprised of five case enclosures and five light assemblies. However, the light bar could be constructed with different numbers of case enclosures 16. In addition, as will be described, each case enclosure 16 contains one light assembly 18. However, the light bar could be constructed with each case enclosure 16 containing a multiple of different light assemblies 18.

The support 14 is a flexible, thin metallic or other formable material strip having an elongate length between opposite ends 22, 24 of the support. Other materials, for example a rigid but flexible plastic material, could be used in constructing the support. The support has opposite, flat, front 26 and rear 28 surfaces. The front surface 26 of the support is shown in FIG. 3. A plurality of electrical wiring holes 32 pass through the support. The wiring holes 32 are positioned to permit entry of power wiring into the case enclosures 16 to permit operation of the light assemblies 18 and are spatially arranged along the length of the support.

Fastener holes 34 are used in removably attaching the case enclosures 16 to the front surface 26 of the support 22 when mechanical fasteners are employed. Where other type of fasteners are employed, for example adhesives, the fastener holes 34 could be eliminated from the support 14.

The length dimension of the support 14 between its opposite ends 22, 24 is determined for the particular vehicle with which the light bar 12 will be employed. The length dimension extends the support 14 across the front of a vehicle windshield where the windshield meets the top or roof surface of the vehicle, as will be explained. The support is sufficiently rigid to support the plurality of case enclosures 16 and light assemblies 18, but is also flexible along the length of the support.

Each of the case enclosures 16 has a front wall 42, opposite top 44 and bottom 46 walls and opposite side walls 48, 52. The rear of each case enclosure is left open as shown in FIG. 4. The construction of each case enclosure 16 is basically the same. The curvatures of the sidewalls 48, 52 enhances the transmission of a signal light beam through the case enclosures. The front wall 42, bottom wall 46 and sidewalls 48, 52 of each case enclosure are preferably molded as one piece of a clear or color-tinted plastic material. The top wall 44 of each case enclosure is constructed of a metal and is secured to the remainder of the case enclosure 16 by an adhesive, by fasteners or by other equivalent means. As best seen in FIGS. 4 and 6, several fastener holes 54 pass through the case enclosure and align with the fastener holes 34 through the support 14. Screws, nut and bolt fasteners 56 or other equivalent means secure each case enclosure 16 to the front surface 26 of the support 14 with the rear openings of the case enclosures being closed over by the support front surface.

The light assembly 18 shown in FIGS. 4 and 5 is a schematic representation of only one example of a light assembly that may be employed with the light bar 12 of the present invention. Examples of other types of light assemblies that may be employed in the light bar 12 are disclosed in U.S. Pat. Nos. 5,385,062, 5,537,298, 5,664,865, 5,676,447, 5,697,691 and 5,842,768, all of which are incorporated herein by reference. Because the light assembly 18 is only one example of a light assembly that may be employed in the light bar 12, it is shown schematically in the drawing figures and will be described only generally herein.

Each light assembly 18 includes one or more optical elements 62 that are comprised of either the recently developed high performance LED's or a miniature prefocused halogen lamp with optics or reflectors that are less than two inches in diameter. Although these are very small structures, they are capable of projecting enough light to exceed the requirements of all of the current national standards for emergency warning lights. Each optical element 62 contained in each case enclosure 16 may be stationary and steady burning, stationary and flashing, or rotatable and flashed by motion. Each optical element 62 is positioned in its case 16 to project the required amount of light into a specific area in order to comply with the various national standards.

FIG. 4 shows an embodiment of the light assembly 18 mounted in the interior of a case enclosure 16. The view in FIG. 4 is through the rear opening of the case enclosure 16. FIGS. 5 and 6 show top views of the light assembly 18 of FIG. 4 removed from the case enclosure 16.

The light assembly 18 is basically comprised of two optical elements 62 and a drive mechanism 64 supported on a base 66. The base 66 is a flat, thin metal strip. However, other materials may be employed in constructing the base 66. The base 66 is provided with four fastener holes 68 at the corners of the base. The fastener holes 68 receive fasteners used in securing the light assembly 18 to the bottom wall 46 of the case enclosure 16.

The optical element 62 to the right in FIGS. 4, 5 and 6 is a stationary element and does not oscillate during operation of the light bar 12. The right side optical element 62 could be steady burning or flashed by current interruption. The optical element 62 is mounted on a support bracket 72. The support bracket 72 is mounted on the base 66 by a threaded screw 74 that extends through a hole in the bottom wall 46 of the case enclosure and a hole in the base 66. The screw 74 is secured stationary to the optic element support bracket 72. A lock nut 76 is mounted on the threaded screw 74. To adjust the position of the right side optical element 62, the lock nut 76 is first loosened on the threaded screw 74 from outside the bottom wall 46 of the case enclosure. The threaded screw 74 can then be rotated in either direction to adjustably position the optical element 62 inside the case enclosure 16. When the optical element 62 is in its desired orientation, the lock nut 76 is then screwed on the threaded screw 74 so that it engages against the case enclosure bottom wall 46. This locks the right side optical element 62 in its adjusted position. In this manner, the orientation of the right side optical element 62 in the case enclosure 16 can be adjusted from the exterior of the case enclosure.

The drive mechanism 64 oscillates the left side optical element 62. The drive mechanism 64 is comprised of an electric motor 82 that is mounted on an L-shaped support plate 84. A threaded screw 86 on the underside of the case enclosure 16 extends through a hole in the case enclosure and through a hole in the light assembly base 66 and is secured stationary to the L-shaped support plate 84. A lock nut 88 is mounted on the threaded screw 86. The lock nut 88 is tightened against the bottom wall 46 of the case enclosure 16 from the exterior of the case enclosure to hold the threaded screw 86 stationery relative to the case enclosure.

A driven gear and cam slot mechanism 92 is also mounted on the L-shaped support plate 84. The mechanism 92 can be of the type disclosed in the U.S. Pat. of Menke No. 5,676,447, which issued on Oct. 14, 1997, and is incorporated herein by reference. The driven gear and cam slot mechanism 92 is driven by a worm gear 94 mounted on the shaft of the motor 82. The mechanism 92 oscillates the left side optical element 62 by a continuous belt 96. The belt 96 is wrapped around a driven pulley 98 of the driven gear and cam slot mechanism 92, a double idler pulley 102 and a drive pulley 104 of the left side optical element 62. As best seen in FIGS. 5 and 6, as the belt 94 extends between the driven pulley 98 and the double idler pulley 102 it crosses over itself. The belt 94 also crosses over itself as it extends from the double idler pulley 102 to the drive pulley 104 of the left side optical element 62. Oscillating movement of the driven gear and cam slot mechanism 92 imparts oscillating movement to the left side optical element 62 due to the interconnection provided by the belt.

The arc of oscillating movement of the left side optical element 62 is adjusted by adjusting the position of the L-shaped support plate 84 supporting the drive mechanism 64. The lock nut 88 is first loosened on the threaded screw 86 from beneath the exterior of the case enclosure 16. The threaded screw 86 is then turned through an arc segment. This causes the L-shaped support plate 84 to also turn through the arc segment. FIG. 6 shows the adjusted position of the L-shaped support plate 84. The connection of the belt 96 between the driven gear and cam slot mechanism 92, the double idler pulley 102 and the drive pulley 104 of the left side optical element 62 causes the left side optical element to also be rotated through the same arc segment as the L-shaped support plate 84. When the left side optical element 62 is in its desired orientation, the lock nut 88 is tightened against the bottom wall 46 of the case enclosure 16 securing the optical element 62 in its adjusted position. Thus, the left side optical element 62 can be adjustably positioned inside the case enclosure 16 from the exterior of the case enclosure with the light bar 12 installed on a vehicle.

In the embodiment shown in FIGS. 1 and 2, five case enclosures 16 with their associated light assemblies 18 are mounted to the front surface 26 of the support 14 along the length of the support. The case enclosures 16 are attached to the support front surface 26 by the case enclosure fasteners 56 extending through the fastener holes 34 of the support 14. Wiring 106 of the light assemblies 18 extends through the wiring holes 32 of the support 14 and the wiring holes 32 are sealed closed to prevent moisture from entering the case enclosures 16. The wiring 106 is then connected to a conventional control assembly of the vehicle for controlling the flashing of the light assemblies 18. The flexibility of the support 14 enables it to be bent into a curved configuration as shown in FIG. 2 to match the curvature of the top of a vehicle windshield to which the light bar 12 is to be attached. It is intended that the light bar 12 would be constructed to suit it for a particular vehicle with the curvature of the vehicle windshield being known. This enables the light assemblies 18 to be prepositioned in their optimum positions in each of the case enclosures 16 before the light bar 12 is installed on the vehicle. Should the light bar 12 be installed on a vehicle that is different from the vehicle for which the optical elements of the light bar were first prepositioned, the individual optical element can be reoriented from the exterior of the case enclosure 16 to achieve the desired areas of coverage of light projected from the optical elements 62 with the light bar 12 mounted on the different vehicle.

Figure 8:
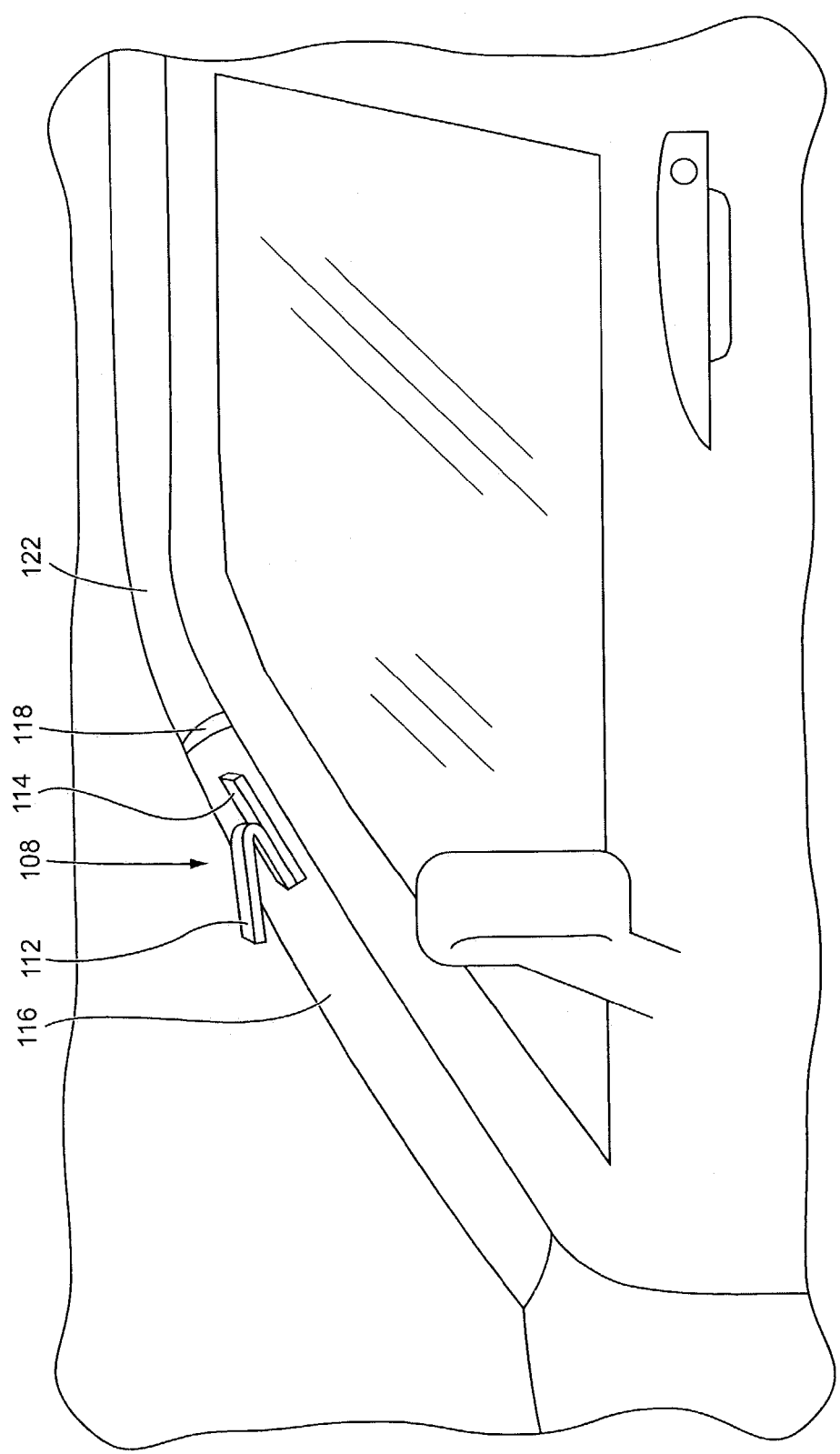
FIG. 8 is a partial view of a mounting bracket for the light bar mounted to a vehicle windshield.
Figure 9:
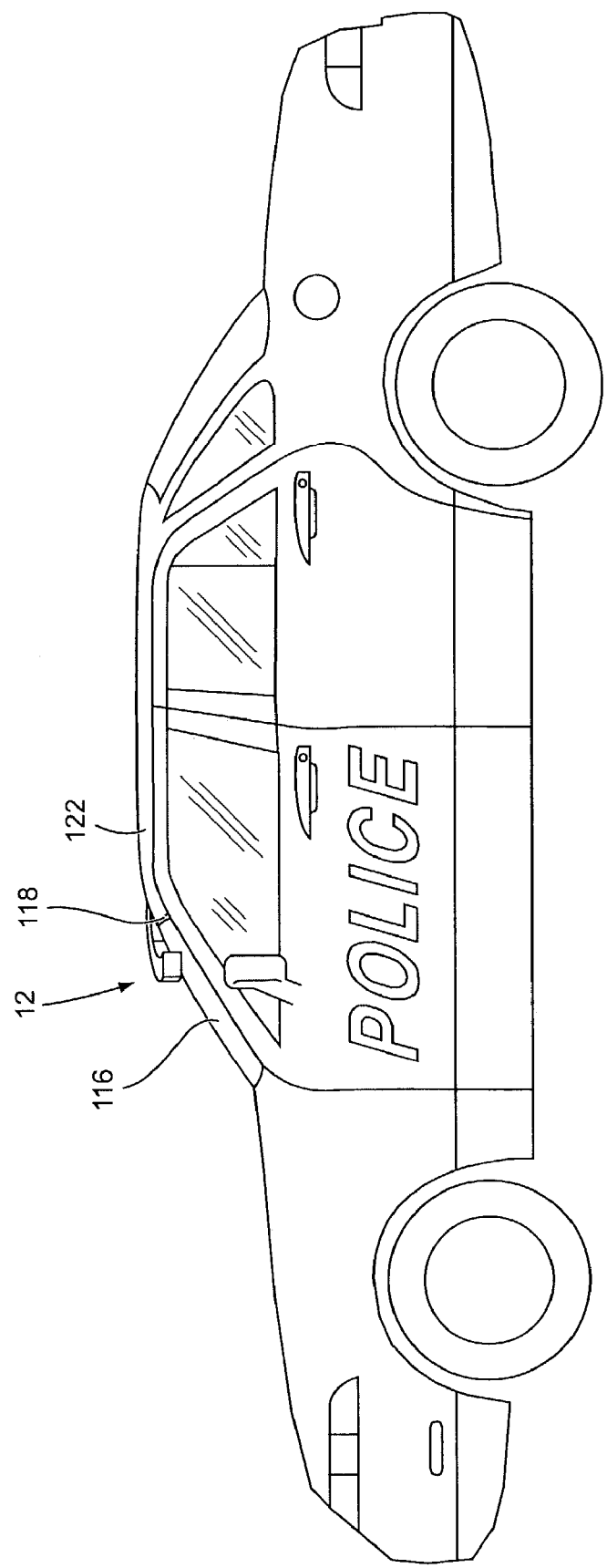
FIG. 9 is a side view of the light bar of the invention attached to the windshield of an emergency vehicle.

A plurality of brackets 108 of the type shown in FIG. 8 are employed in installing the light bar on a vehicle. Each bracket 108 is a metal piece that is bent in a V-shape with a top arm 112 and a bottom arm 114. A top arm 112 of a bracket is secured to the bottom wall 46 of each case enclosure 16 on the support 14. A lesser number of brackets could also be used. The bracket top arms 112 can be attached to the case enclosures by adhesives, by mechanical fasteners or other means. Alternatively, the brackets 108 could be attached to the support 14. The angled orientation of the bracket top arm 112 and bottom arm 114 is predetermined to properly position the light bar 12 relative to the particular vehicle on which the light bar is installed. The bracket bottom arms 114 are designed to be attached to the exterior surface of the vehicle windshield 116 as shown in FIG. 8 by an adhesive or by double-faced adhesive tape. This enables the installer of the light bar 12 to bend the light bar along its length to match the curvature of the top edge 118 of the vehicle windshield 116, and then secure each of the bracket bottom arms 114 to the exterior surface of the windshield to hold the light bar in its curved configuration. In the preferred installation the light bar 12 is attached to the vehicle windshield adjacent the top edge 118 of the windshield where it joins with the rearwardly extending roof or top surface 122 of the vehicle as shown in FIG. 9. More preferably, the top of the light bar 12 does not extend above the top of the vehicle 122 as shown in FIG. 9. On most vehicles this positions the light bar 12 in the tinted area at the top of the vehicle windshield which enhances the ability of the light bar to blend into the profile of the vehicle making it difficult to observe the light bar from a short distance from the vehicle. The camouflaging of the light bar 12 to the vehicle is further enhanced by giving the bottom walls 46 and top walls 44 of the case enclosures 16 and the support 14 a flat black color or a nonreflective texture.

By employing adhesives or double-faced adhesive tape in installing the light bar 12 on the exterior of the vehicle windshield 116 as shown in FIG. 9, the installation is cost efficient. Furthermore, the case enclosures 16 can be easily removed from the support 14 without removing the support from the windshield 116, making maintenance of the light assemblies cost efficient. Several additional case enclosures 16 containing light assemblies 18 could be kept in inventory to replace a case enclosure 16 that is removed from the support 14 for servicing, thus preventing the vehicle from being taken out of service.

The light bar 12 can be removed from the windshield 116 by breaking the adhesive or double-sided tape connection of the brackets 108 to the windshield exterior surface. This makes removal of the light bar from the vehicle cost efficient when the vehicle is decommissioned. Adhering the brackets 108 to the vehicle windshield 116 enables the brackets 108 to be removed from the vehicle when the vehicle is decommissioned without damage to the vehicle. However, the brackets 108 or other type of mounting mechanism could be employed on other parts of the vehicle, for example the vehicle roof or top surface 118, in positioning the light bar 12 in its preferred position relative to the vehicle windshield shown in FIG. 9.

Although a preferred embodiment of the light bar of the invention has been described herein, it should be understood that other variations and modifications of the light bar could be arrived at without departing from the scope of the invention defined by the following claims. For example, the light bar could be installed on the rear window of a vehicle within the vehicle's profile.

What is claimed is:

1. A light bar for a vehicle, the vehicle having opposite front and rear ends, the vehicle having front facing and rear facing windows each having an exterior top edge, and the vehicle having an exterior top surface between the top edges of the front facing and rear facing windows, the light bar comprising:

an elongate support having a length dimension that enables the support to extend across either of the front facing and rear facing windows along the window top edge;

a plurality of light assemblies connected to the support in positions that are spacially arranged along the length of the support; and, at least one mounting bracket having means for connecting the mounting bracket to the light bar and having means for connecting the mounting bracket to the vehicle to hold the support and the plurality of light assemblies connected to the support in positions extending across either of the front facing or rear facing windows adjacent the top edge and not above the top surface of the vehicle.

2. The light bar of claim 1, further comprising:

the mounting bracket means being configured to hold the elongate support and the plurality of light assemblies connected to the support in positions in front of the top edge of either of the front facing and rear facing windows.

3. The light bar of claim 1, further comprising;

the mounting bracket means being configured to hold the elongate support and the plurality of light assemblies connected to the support in positions below the top surface of the vehicle.

4. The light bar of claim 1, further comprising:

the mounting bracket means being connectable to either of the front facing and rear facing windows.

5. The light bar of claim 4, further comprising:

the mounting bracket means being connectable to either of the front facing and rear facing windows by an adhesive.

6. The light bar of claim 1, further comprising:

the support having opposite front and rear surfaces extending along the length of the support, the support rear surface opposing the top edge of either of the front facing and rear facing windows when the mounting bracket means is connected to the light bar and to the vehicle, and the plurality of light assemblies being connected to only the front surface of the support.

7. The light bar of claim 1, further comprising:

a plurality of separate cases mounted to the elongate support and arranged along the length of the support; and, each light assembly of the plurality of light assemblies being mounted in one case of the plurality of cases.

8. The light bar of claim 1, further comprising:

the elongate support being flexible along the length of the support.

9. A light bar for a vehicle, the vehicle having opposite front and rear ends, the vehicle having a front facing window and a rear facing window each with a curved exterior top edge and the vehicle having an exterior top surface that extends between the top edges of the front and rear facing windows, the light bar comprising:

an elongate support having a length dimension that enables the support to extend across either of the vehicle windows, the support being flexible along the length of the support enabling the support to bend in a curved configuration that follows the curve of the top edges of either of the windows;

a plurality of light assemblies connected to the support in positions that are spacially arranged along the length of the support; and, at least one mounting bracket having means for connecting the mounting bracket to the light bar and having means for connecting the mounting bracket to the vehicle to hold the support in the curved configuration extending across either of the vehicle windows.

10. The light bar of claim 9, further comprising:

the mounting bracket means being connectable to the vehicle window to hold the support in the curved configuration in a position spaced in front of the window top edge.

11. The light bar of claim 9, further comprising:

the mounting bracket means being one of a plurality of mounting brackets that are connectable to the light bar and are connectable to the vehicle to hold the support in the curved configuration in a position spaced in front of the window top edge.

12. A light bar for a vehicle, the vehicle having opposite front and rear ends, the vehicle having a front facing window and a rear facing window each with a curved exterior top edge and the vehicle having an exterior top surface that extends between the top edges of the front and rear facing windows, the light bar comprising:

an elongate support having a length dimension that enables the support to extend across either of the vehicle windows, the support being flexible along the length of the support enabling the support to bend in a curved configuration that follows the curve of the top edges of either of the windows;

a plurality of light assemblies connected to the support in positions that are spacially arranged along the length of the support;

at least one mounting bracket having means for connecting the mounting bracket to the light bar and having means for connecting the mounting bracket to the vehicle to hold the support in the curved configuration extending across either of the vehicle windows; and, the plurality of light assemblies being movable relative to each other in response to the support bending to the curved configuration.

13. The light bar of claim 9, further comprising:

a plurality of separate cases mounted to the support along the length of the support, each case of the plurality of cases containing a light assembly of the plurality of light assemblies.

14. The light bar of claim 13, further comprising:

the plurality of cases being moveable relative to each other in response to the support bending to the curved configuration.

15. The light bar of claim 9, further comprising:

the support having opposite front and rear surfaces, the support rear surface opposing the vehicle window when the bracket is connected to the light bar and to the vehicle, and the plurality of light assemblies being connected to only the support front surface.

16. A light bar for a vehicle, the vehicle having opposite front and rear ends, the vehicle having front and rear facing windows each with an exterior top edge and the vehicle having an exterior top surface that extends between the top edges of the windows, the light bar comprising:

an elongate support having a length dimension that enables the support to extend across one of the vehicle windows;

a plurality of separate cases mounted to the support at positions spacially arranged along the length of the support;

a plurality of light assemblies, each light assembly of the plurality of light assemblies being mounted in a case of the plurality of cases for adjusting movement of the light assembly relative to the case to adjust a projection direction of a light beam projected by the light assembly; and, at least one mounting bracket that is connectable to the light bar and is connectable to the vehicle to hold the support, the plurality of cases and the plurality of the light assemblies of the light bar in positions extending across the window.

17. The light bar of claim 16, further comprising:

the mounting bracket being configured to hold the support, the plurality of cases and the plurality of light assemblies in positions in front of the vehicle window.

18. The light bar of claim 16, further comprising:

the at least one mounting bracket being connectable to the vehicle window.

19. The light bar of claim 16, further comprising:

the at least one mounting bracket being one of the plurality of separate mounting brackets that are each connectable to the light bar and to the vehicle.

20. The light bar of claim 16, further comprising:

the support having opposite front and rear surfaces, the support rear surface opposing the vehicle when the mounting bracket is connected to the light bar and to the vehicle, and the plurality of cases and the plurality of light assemblies being mounted to only the front surface of the support.

* * * * *